United States Patent [19]

Asano

[11] Patent Number: 4,491,114

[45] Date of Patent: Jan. 1, 1985

[54] FUEL INJECTION MEANS FOR AN INTERNAL COMBUSTION ENGINE OF AN AUTOMOBILE

[75] Inventor: Masaharu Asano, Yokosuka, Japan

[73] Assignee: Nissan Motor Company, Limited, Yokohama, Japan

[21] Appl. No.: 383,276

[22] Filed: May 28, 1982

Related U.S. Application Data

[63] Continuation of Ser. No. 135,351, Mar. 31, 1980, abandoned.

[30] Foreign Application Priority Data

Apr. 2, 1979 [JP] Japan .................. 54-38398

[51] Int. Cl.³ .............................. F02M 51/00
[52] U.S. Cl. .................... 123/492; 123/487
[58] Field of Search ............... 123/487, 490, 492, 493

[56] References Cited

U.S. PATENT DOCUMENTS

| | | | |
|---|---|---|---|
| 3,749,070 | 7/1973 | Oishi et al. | 123/492 |
| 3,809,029 | 5/1974 | Wakamatsu et al. | 123/487 |
| 3,858,561 | 1/1975 | Aono | 123/492 |
| 4,048,965 | 9/1977 | Bianchi et al. | 123/487 |
| 4,058,709 | 11/1977 | Long | 123/487 |
| 4,073,270 | 2/1978 | Endo | 123/487 |
| 4,100,891 | 7/1978 | Williams | 123/487 |
| 4,148,283 | 4/1979 | Harada et al. | 123/492 |
| 4,184,458 | 1/1980 | Aoki et al. | 123/492 |
| 4,184,461 | 6/1980 | Leung | 123/492 |
| 4,187,812 | 2/1980 | Hosaka et al. | 123/492 |
| 4,221,191 | 9/1980 | Asano et al. | 123/492 |
| 4,240,383 | 12/1980 | Horbelt et al. | 123/492 |
| 4,265,200 | 5/1981 | Wessel et al. | 123/487 |
| 4,296,722 | 10/1981 | Furuhashi et al. | |
| 4,301,779 | 11/1981 | Hufton | 123/487 |

Primary Examiner—Parshotam S. Lall
Attorney, Agent, or Firm—Schwartz, Jeffery, Schwaab, Mack, Blumenthal & Koch

[57] ABSTRACT

A fuel injection means for an internal combustion engine of an automobile is disclosed which comprises a pulse length determination circuit which receives a driving condition signal and develops a signal of a pulse length corresponding to the driving condition, a fuel injection starting signal generator circuit which develops a fuel injection starting signal and a driving signal generator circuit which develops a driving signal of a pulse length corresponding to that of the signal from the pulse length determination circuit. The driving signal thus developed is sent to a fuel injection valve, thereby fuel of a reliably controlled quantity is injected with a reliably controlled timing not only during usual driving condition but also during acceleration.

22 Claims, 14 Drawing Figures

FUEL INJECTION MEANS FOR AN INTERNAL COMBUSTION ENGINE OF AN AUTOMOBILE

This is a continuation of application Ser. No. 135,351, filed Mar. 31, 1980, now abandoned.

BACKGROUND OF THE INVENTION

The present invention relates to a fuel injection means for an internal combustion engine of an automobile which is improved in such a way as to inject fuel of a reliably controlled quantity with a reliably controlled timing not only during usual driving conditions but also during acceleration.

In a conventional fuel injection system for an internal combustion engine of an automobile of the type which digitally determines the pulse length of a fuel injection signal using a microcomputer or the like, some timing gaps are apt to occur between the moment ($t_1$) indicating receipt of an input instructing the calculation of the pulse length for fuel injection and the moment ($t_2$) indicating receipt of the calculation in accordance with the input instruction and between the moment ($t_2$) defined above and the moment ($t_3$) indicating the development of an output of a determined pulse length for fuel injection. In addition, the input which is received at the moment ($t_1$) is usually a signal having an instantaneous value. As a result, for example, in case an acceleration signal is received just before the normal fuel injection moment, it becomes impossible to immediately change the pulse length or the timing for fuel injection in response to the acceleration. On such an occasion, the timing to increase the fuel quantity is delayed, thereby making it impossible to maintain proper driving conditions.

SUMMARY OF THE INVENTION

With the above in mind, an object of the present invention is to provide fuel injection means which is capable of injecting a fuel with a reliably controlled timing.

Another object of the present invention is to provide a fuel injection means which is capable of injecting fuel of a reliably controlled quantity.

Another object of the present invention is to provide fuel injection means which is capable of injecting a fuel of a quantity which is controlled in accordance with various kinds of driving conditions of an engine such as intake air quantity, engine rotation rate, engine temperature, atmospheric temperature, atmospheric pressure or the like.

Another object of the present invention is to provide a fuel injection means which is capable of reliably changing the timing for fuel injection in an acceleration driving condition.

The other objects and advantages of the invention will be understood by hereafter described preferred embodiments of the invention.

BRIEF DESCRIPTION OF THE DRAWINGS

The present invention will be illustrated more fully by way of examples with reference to the accompanying drawings, in which.

In all the drawings, the same reference numeral indicates the same or corresponding element.

DETAILED DESCRIPTION OF THE PRESENT INVENTION

Figure 1:
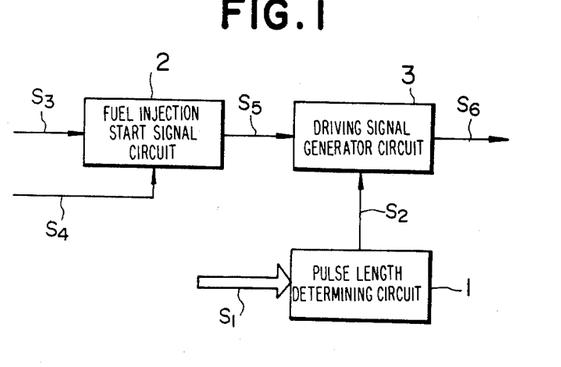
FIG. 1 is a block diagram showing the constitution as a whole of a fuel injection means for an internal combustion engine of an automobile in accordance with one embodiment of the present invention.

Referring now to FIG. 1, a preferred embodiment of a fuel injection means for an internal combustion engine of an automobile in accordance with the present invention will be described.

Reference numeral 1 in FIG. 1 denotes a pulse length determination circuit which receives a driving condition signal $S_1$ in accordance with various kinds of driving conditions of an engine such as intake air quantity, engine rotation rate, engine temperature, atmospheric temperature, atmospheric pressure or the like, calculates a fuel injection quantity corresponding to the driving condition signal $S_1$ and develops a signal $S_2$ of a pulse length which corresponds to the fuel injection quantity. A fuel injection starting signal generator circuit 2 receives a reference positional signal $S_3$ which is developed in such a way as to correspond to each reference position of a crank angle (for example, for each angle of 120° in the case of four cycle and six cylinder engine) or an acceleration signal $S_4$ which is developed during accelerating driving condition. This circuit 2 develops a fuel injection starting signal $S_5$ usually at the time when a predetermined number of reference positional signals $S_3$ are received, while in case the acceleration signal $S_4$ is received, the fuel injection starting signal $S_5$ is developed with a timing different from that in the usual driving condition. Reference numeral 3 denotes a driving signal generator circuit which develops a driving signal $S_6$ of a pulse length corresponding to that of the signal $S_2$ upon receipt of the fuel injection starting signal $S_5$. The driving signal $S_6$ thus developed is sent to and drives a fuel injection valve (not shown) so as to supply a fuel of a reliably controlled quantity to the engine with a reliably controlled timing not only in the usual driving condition but also in the accelerating driving condition.

Each of the above-mentioned pulse length determination circuit 1, fuel injection starting signal generator circuit 2 and driving signal generator circuit 3 may be composed of analogue circuit, digital circuit or any other arithmetic circuit employing computer means or suitable combination of these circuits.

Figure 2:
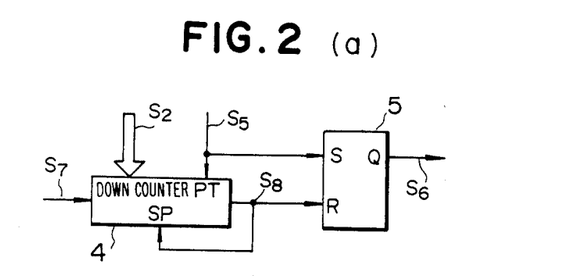
FIG. 2(a) is a block diagram showing one example of the driving signal generator circuit 3 in FIG. 1.
FIG. 2(b) is a block diagram showing another example of the driving signal generator circuit 3 in FIG. 1.

FIG. 2(a) and FIG. 2(b) respectively show concrete circuit examples of the driving signal generator circuit 3 which is shown in FIG. 1. FIG. 2(a) is the example which has employed a preset down counter while FIG. 2(b) is the example which has employed a preset up counter.

In FIG. 2(a), if a fuel injection starting signal $S_5$ which is developed from the fuel injection starting signal generator circuit 2 in FIG. 1 is supplied to a preset terminal PT, the signal $S_2$ of a predetermined pulse length which is developed from the pulse length determination circuit 1 in FIG. 1 is preset in a preset down counter 4, whereupon the counter 4 starts to count down whenever the clock pulse $S_7$ is supplied thereto. When the number of the clock pulses $S_7$ thus counted coincides with the preset number $S_2$, the counter 4 develops a signal $S_8$ which is supplied to a stop terminal SP so as to halt the counting.

On the other hand, reference numeral 5 denotes a flip flop circuit which is set upon receipt of the fuel injection starting signal $S_5$ and is reset upon receipt of the signal $S_8$ which is developed from the counter 4 as mentioned above. Therefore, the output of the flip flop 5 which is developed from the terminal Q becomes a signal which starts from the time the fuel injection starting signal $S_5$ is supplied and continues for a pulse length which is set so as to correspond to that of the signal $S_2$. This output signal as developed in such a way from the flip flop 5 is employed as the above-mentioned driving pulse signal $S_6$ which is sent to and drives a fuel injection valve so as to supply a fuel of a reliably controlled quantity to the engine.

In the example which is shown in FIG. 2(b), a preset up counter 6 counts the clock pulses $S_7$ from the time when the fuel injection starting signal $S_5$ is supplied to its starting terminal ST from the fuel injection starting signal generator circuit 2. Reference numeral 7 denotes a comparator circuit which compares the signal $S_8$ indicating the number of clock pulses $S_7$ thus counted in the counter 6 and the signal $S_2$ which is developed from the pulse length determination circuit 1 and the pulse length of which is in correspondence with the driving condition signal $S_1$, and as a result, if the signal $S_8$ indicating the number of clock pulses $S_7$ and the signal $S_2$ coincide with each other, a coincident signal $S_9$ is developed from the comparator circuit 7. This coincident signal $S_9$ is sent to the stop terminal SP of the preset up counter 6 so as to stop the counting and clear the counted contents thereof.

On the other hand, reference numeral 8 denotes a flip flop circuit which is set upon receipt of the fuel injection starting signal $S_5$ and is reset upon receipt of the coincident signal $S_9$ from the comparator circuit 7. Therefore, the output of the flip flop circuit 8 which is developed from the terminal Q becomes a signal which starts from the time when the fuel injection starting signal $S_5$ is supplied and continues for a pulse length which is set so as to correspond to that of the signal $S_2$. This output signal from the flip flop circuit 8 is employed as the above-mentioned driving signal $S_6$, which is sent to a fuel injection valve so as to supply a fuel of a reliably controlled quantity to the engine.

Now, the fuel injection starting signal generator circuit 2 will be mentioned later in more detail.

Figure 3:
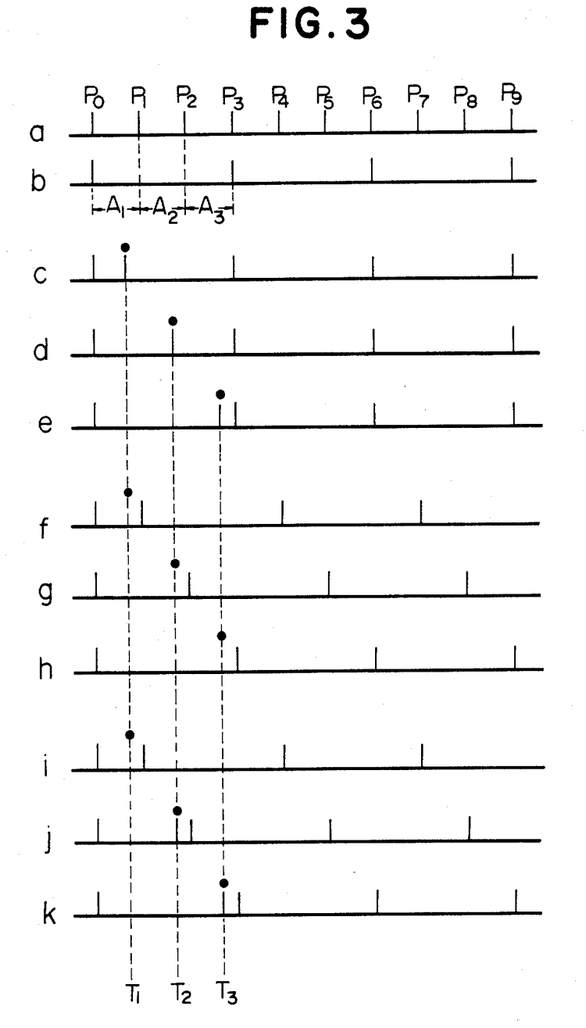
FIG. 3 is a timing chart showing the relationship of various signals.

In FIG. 3 which shows timing charts in respect of the relationship of the reference positional pulse signals $S_3$, the acceleration signal $S_4$ and the fuel injection starting signal $S_5$, (a) indicates the reference positional pulse signals $S_3$, the black dots (•) indicate the acceleration signals $S_4$ and (b)-(k) indicate the fuel injection starting signals $S_5$.

In a usual driving condition on which the acceleration signal $S_4$ is not supplied, the fuel injection starting signal $S_5$ is developed at every time when three reference positional pulse signals (a) are received, in other words, at every time when each one of pulses $P_0$, $P_3$, $P_6$, $P_9$ . . . is received as indicated by (b) (which shows the case of four cycle and six cylinder engine and in which the reference positional pulse signal $S_3$ is developed for each 120° of the crank angle so as to inject fuel once per one rotation).

Figure 4:
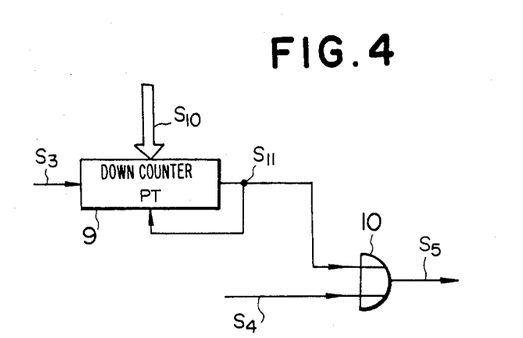
FIG. 4 is a circuit diagram showing one example of the fuel injection starting signal generator circuit 2 in FIG. 1.

In FIG. 4 which shows the first concrete circuit example of the above-mentioned fuel injection starting signal generator circuit 2, reference numeral 9 denotes a preset down counter which presets a preset value $S_{10}$ therein if a signal $S_{11}$ which is developed therefrom is supplied to its preset terminal PT, whereupon the counter 9 counts down whenever the reference positional pulse signal $S_3$ is supplied thereto and develops the signal $S_{11}$ if the number of reference positional pulse signals $S_3$ thus counted coincide with the preset value $S_{10}$. For example, in case the preset value $S_{10}$ is "3", the signal $S_{11}$, is developed at every time when the counter 9 receives three reference positional pulse signals $S_3$.

Then, the signal $S_{11}$ thus developed from the counter 9 is supplied to an OR gate circuit 10 to which the acceleration signal $S_4$ is also supplied. Upon receipt of either one of the signal $S_{11}$ and the acceleration signal $S_4$, the OR gate circuit 10 develops the fuel injection starting signal $S_5$.

In other words, the signal $S_{11}$ which is developed at every time when three reference positional pulse signals $S_3$ are received by the preset down counter 9 and the acceleration signal $S_4$ are developed as the fuel injection starting signal $S_5$ completely independently from each other. Thus, as seen from (c), (d) and (e) in FIG. 3, the fuel injection starting signal $S_5$ is developed at $T_1$, $T_2$ and $T_3$ when the acceleration signal $S_4$ are supplied as indicated by the black dots (•) in addition to the development with a usual timing as indicated by $P_0$, $P_3$, $P_6$ and $P_9$.

It is to be understood that the best response can be brought about in this case because of its immediate injection of fuel at the time when the acceleration signal $S_4$ is supplied. In case the function in FIG. 4 is provided by microcomputers and program-controlled, the acceleration signal $S_4$ may be used for an interrupt request signal, thereby performing an interruption handling routine.

As the above-mentioned acceleration signal $S_4$ which is to be developed in the case of demand for acceleration of the engine, for example, the signals from the means such as the following (1)-(8) are used.

(1) means which develops an acceleration signal $S_4$ at the time when a throttle switch which detects whether a throttle valve (or an acceleration pedal) is completely closed or not changes from its completely closed position to its opened position.

(2) means which employs a throttle valve's opening degree sensor for developing an opening degree signal in correspondence with the opening degree of the throttle valve and develops an acceleration signal $S_4$ when the changing rate of the opening degree signal in the direction for opening becomes not smaller than a predetermined value.

(3) means to sample the signals from the throttle switch or the throttle valve's opening degree sensor and judge the conditions as mentioned in the above (1) or (2) by comparing the sampled values on various occasions.

(4) means to develop an acceleration signal $S_4$ only in case the completely closed condition has continued for more than a predetermined time in the above-mentioned (1) and after that, the opened condition is achieved.

(5) means to develop an acceleration signal $S_4$ in case the condition in which the changing rate does not vary by more than a predetermined value has continued for more than a predetermined time and thereafter the opening degree signal has changed in the direction for opening with a changing rate higher than a predetermined value in the above-mentioned (2).

(6) means to judge the condition as mentioned in the above (4) and (5) by sampling the signals from the throttle switch or the throttle opening degree sensor and detecting whether the sampling value has changed after having continued for more than a predetermined number.

(7) means to develop the acceleration signal $S_4$ in case the signal from the intake air flow rate sensor (for example, the air flow meter) for detecting the intake air flow quantity in the engine has changed in the direction to increase the intake air flow rate with a changing rate higher than a predetermined value.

(8) means to develop an acceleration signal $S_4$ in case the pulse length of the fuel injection pulse signal which determines the fuel injection quantity has changed in the direction to increase the fuel quantity with a changing rate higher than a predetermined value.

The function of each means mentioned in the above (1) through (8) may be provided for by means of hardware a microcomputer.

Figure 5:
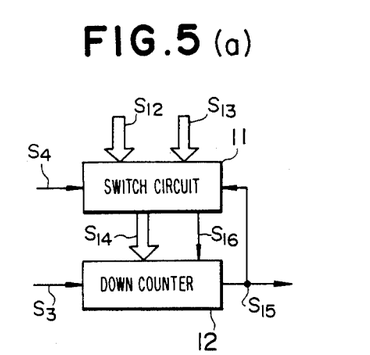
FIG. 5(a) is a block diagram showing another example of the fuel injection starting signal generator circuit 2 in FIG. 1.
FIG. 5(b) shows wave forms of the signals in FIG. 5(a)

FIG. 5(a) shows a block diagram of a second embodiment of the fuel injection starting signal generator circuit 2 and FIG. 5(b) show wave forms of signals in FIG. 5(a).

Reference numeral 11 in FIG. 5(a) denotes a preset data switching circuit which switches two kinds of preset data $S_{12}$ and $S_{13}$ depending upon whether the acceleration signal $S_4$ is received or not and develops a signal $S_{14}$ indicating one of the preset data $S_{12}$ and $S_{13}$. For example, in case the acceleration signal $S_4$ is not supplied to the preset data switching circuit 11, one of the preset data, that is, $S_{12}$ which is, for example, "3" is indicated by the signal $S_{14}$ and in case the acceleration signal $S_4$ is supplied to the preset data switching circuit 11, the other of the preset data, that is, $S_{13}$ which is, for example, "1" is indicated by the signal $S_{14}$. In addition, the preset data switching circuit 11 develops a presetting signal $S_{16}$ at the time when the acceleration signal $S_4$ is supplied thereto and at the time when a signal $S_{15}$ which is developed from a preset down counter 12 as mentioned below is supplied thereto.

On the other hand, the preset down counter 12 presets therein the preset datum of the signal $S_{14}$ from the preset data switching circuit 11 upon receipt of the presetting signal $S_{16}$ from the preset data switching circuit 11, whereupon the preset down counter 12 starts to count down whenever the reference positional pulse signal $S_3$ is supplied thereto. If the counted value in the preset down counter 12 coincides with the preset datum of the signal $S_{14}$, the signal $S_{15}$ is developed therefrom. Therefore, in case the preset datum is "3" in a usual driving condition, the signal $S_{15}$ is developed whenever three reference positional pulse signals $S_3$ are counted. On the other hand, in case the preset datum is "1" in an accelerating driving condition, the signal $S_{15}$ is developed when one reference positional pulse signal $S_3$ is counted. The signal $S_{15}$ which is developed from the preset down counter 12 in such a way is used as the above-mentioned fuel injection starting signal $S_5$. In this case, the counted contents in the preset down counter 12 becomes as shown by the wave form 12 in FIG. 5(b).

Therefore, as seen from (f), (g) and (h) in FIG. 3, the fuel injection starting signal $S_5$ is developed upon receipt of the first reference positional pulse signal having received the acceleration signal as indicated by the black dot (●). After that, the fuel injection starting signal $S_5$ is developed whenever three reference positional pulse signals are received. In other words, in the embodiment of FIG. 5, the fuel injection starting signal $S_5$ is developed earlier than usual in case the acceleration signal $S_4$ is in the range $A_1$ (between $P_0$ and $P_1$) and in the range $A_2$ (between $P_1$ and $P_2$), thereby increasing the density of injected fuel. On the other hand, in case the acceleration signal $S_4$ is given in the range $A_3$ (between $P_2$ and $P_3$), the fuel injection starting signal $S_5$ is developed as usual.

FIG. 6(a) shows a block diagram of the third embodiment of the fuel injection starting signal generator circut 2 and FIG. 6(b) shows wave forms of signals in FIG. 6(a).

Reference numeral 14 in FIG. 6(a) denotes a comparison data switching circuit which develops a comparison datum $S_{17}$ which is, for example, "1" as a comparison value if an acceleration signal $S_4$ is supplied thereto and develops another comparison datum $S_{18}$ which is, for example, "3" as the comparison value if a switching signal $S_{22}$ (this is a signal which has delayed the reference positional pulse signal $S_3$ by a predetermined time ($\tau$) by means of a delay circuit 16) is applied.

The reference positional pulse signals $S_3$ are received by an up counter 13 which counts the number of pulse signals $S_3$ and develops a signal $S_{20}$ indicating the counted value. The counted contents in the counter 13 may be cleared if a signal $S_{21}$ from a comparator circuit 15 as mentioned below is supplied to a clear terminal CL thereof.

On the other hand, the comparator circuit 15 compares the comparison value indicated by the signal $S_{19}$ and the counted value indicated by the signal $S_{20}$ and develops the above-mentioned signal $S_{21}$ if $S_{19} \leq S_{20}$.

In other words, in case an acceleration signal $S_4$ is supplied to the comparison data switching circuit 14 when no reference positional pulse signal $S_3$ is supplied (in the range $A_1$ in FIG. 3) after having developed the signal $S_{21}$, the signal $S_{21}$ is developed upon receipt of the next reference positional pulse signal $S_3$. After that, the signal $S_{21}$ is developed whenever three reference positional pulse signals $S_3$ are received. In case the acceleration signal $S_4$ is supplied when one or more reference positional pulse signal $S_3$ is supplied (in the ranges $A_2$ and $A_3$ in FIG. 3) after having developed the signal $S_{21}$, the signal $S_{21}$ is developed upon receipt of the acceleration signal $S_4$, and further the signal $S_{21}$ is also developed upon receipt of the first reference positional pulse signal $S_3$ after having developed the signal $S_{21}$. After that, the signal $S_{21}$ is developed whenever three reference positional pulse signals $S_3$ are received. The signal $S_{21}$ which is developed as mentioned above is used as the fuel injection starting signal $S_5$.

Figure 6:
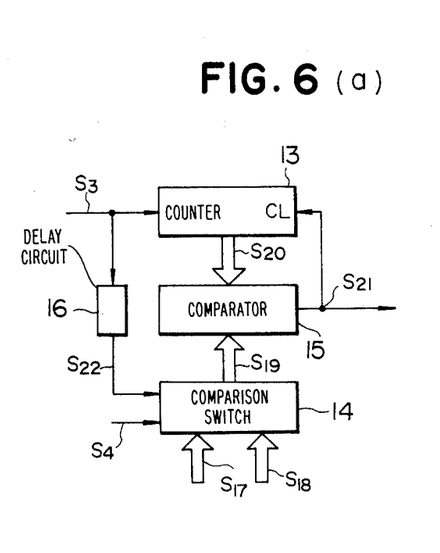
FIG. 6(a) is a block diagram showing still another example of the fuel injection starting signal generator circuit 2 in FIG. 1.
FIG. 6(b) shows wave forms of the signals in FIG. 6(a)

As seen from (i), (j) and (k) in FIG. 3, the number of fuel injection starting signals $S_5$ differs in the embodiment shown in FIG. 6 depending upon whether the acceleration signal $S_4$ is supplied in the range $A_1$ or in the range $A_2$ or $A_3$. This embodiment has an intermediate nature of the embodiments shown in FIG. 4 and FIG. 5.

Since the timing for injecting fuel is changed upon receipt of the acceleration signal $S_4$ in accordance with the present invention as mentioned above, there occurs such occasion that the calculation for determining the pulse length in the pulse determination circuit 1 is delayed and the signal $S_2$ of a predetermined pulse length is not developed when the fuel injection starting signal $S_5$ is supplied. In order to avoid from the occurrence of such occasion for the delay of the calculation in the pulse length determination circuit 1, it is desirable that such systems as shown in FIG. 7 through FIG. 9 are employed.

Figure 7:
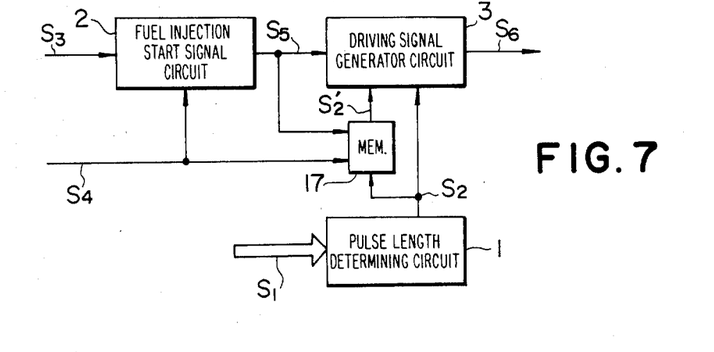
FIG. 7 is a block diagram showing the constitution as a whole of a fuel injection means for an internal combustion engine of an automobile in accordance with another embodiment of the present invention.

The embodiment which is shown in FIG. 7 is adapted to provide a pulse length at the preceding time for fuel injection as the pulse length at the time when the fuel is injected for the first time after receipt of the acceleration signal $S_4$. That is, reference numeral 17 in FIG. 7 denotes a memory circuit which stores the signal $S_2$ of a predetermined pulse length and make new its memory contents at every time when the fuel injection is effected. In case the fuel injection starting $S_5$ is developed for the first time after receipt of the acceleration signal $S_4$, the contents stored in the memory circuit 17 is employed as the signal $S_2'$ of a predetermined pulse length, which is used in the driving signal generator circuit 3 for developing the driving signal $S_6$ as mentioned before.

Figure 8:
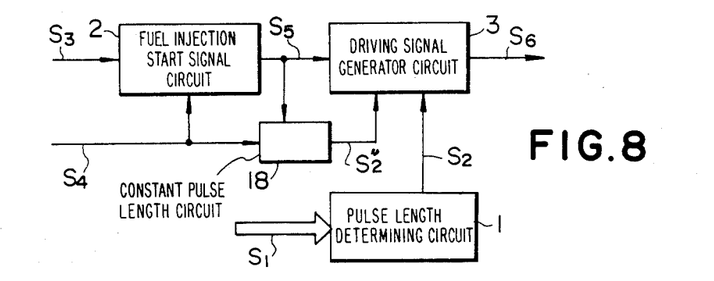
FIG. 8 is a block diagram showing the constitution as a whole of a fuel injection means for an internal combustion engine of an automobile in accordance with still another embodiment of the present invention.

The embodiment which is shown in FIG. 8 is adapted to use a signal $S_2''$ of a predetermined pulse length which is always constant at the time when the fuel is for the first time injected after receipt of the acceleration signal $S_4$. That is, reference numeral 18 in FIG. 8 denotes a constant pulse length circuit 18 (, which is composed of, for example, a monostable multivibrator and a control circuit) which develops the signal $S_2''$ of a predetermined pulse length which is always constant at the time when the fuel is for the first time injected after receipt of the acceleration signal $S_4$. The signal $S_2''$ which is thus developed from the circuit 18 is employed instead of the above-mentioned signal $S_2$ of a predetermined pulse length for developing the driving signal $S_6$ in the same way as mentioned before.

Figure 9:
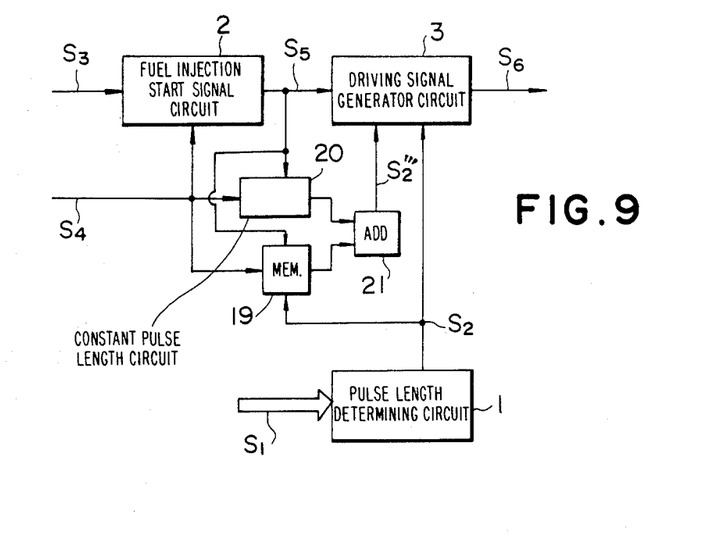
FIG. 9 is a block diagram showing the constitution as a whole of a fuel injection means for an internal combustion engine of an automobile in accordance with still another embodiment of the present invention.

The embodiment which is shown in FIG. 9 is adapted to use a signal of a pulse length which is determined by adding a predetermined pulse length which is always constant to a pulse length at the preceding time for fuel injection. That is, reference numeral 19 in FIG. 9 denotes a memory circuit which receives and stores the signal $S_2$ of a predetermined pulse length and make new its memory contents at every time when the fuel is injected. Reference numeral 20 denotes a constant pulse length circuit (which is constituted in the same way and has the same function as the abovementioned circuit 18). If the fuel injection starting signal $S_5$ is for the first time developed after receipt of the acceleration signal $S_4$, the memory circuit 19 develops a signal of a pulse length at the preceding time for fuel injection, while the constant pulse length circuit 20 develops a signal of a predetermined pulse length circuit 21 develops a signal of a predetermined pulse length which is always constant. Both the signals from the memory circuit 19 and the constant pulse length circuit 20 are received by an adder circuit 20, which adds both the signals and develops a signal $S_2'''$ of an added pulse length of both the signals. The signal $S_2'''$ is used instead of the signal $S_2$ of a predetermined pulse length for developing the driving signal $S_6$ in the same way as mentioned before.

Figure 10A:
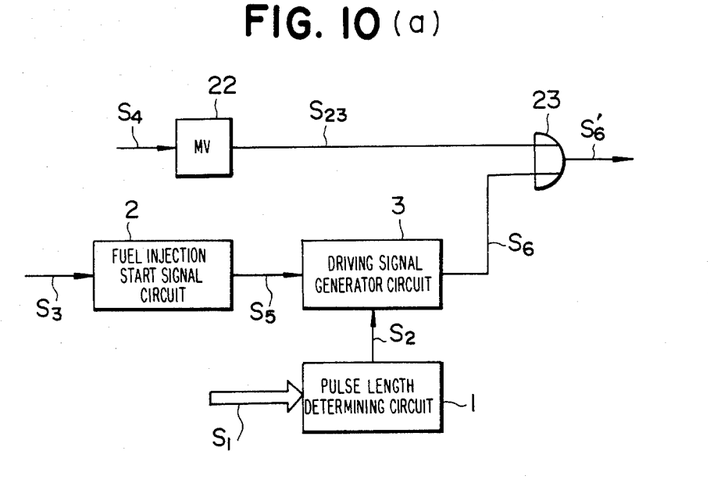
FIG. 10(a) is a block diagram showing the constitution as a whole of a fuel injection means for an internal combustion engine of an automobile in accordance with still another engine of an automobile in accordance with still another embodiment of the present invention.
Figure 10B:
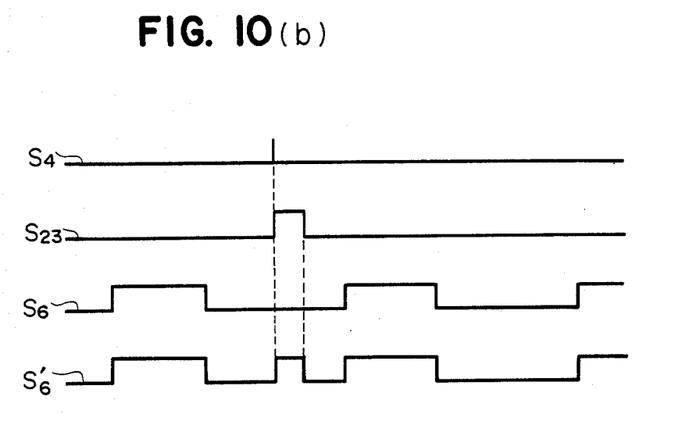
FIG. 10(b) shows wave forms of the signals in FIG. 10(a).

FIG. 10(a) shows a block diagram of another embodiment in accordance with the present invention and FIG. 10(b) shows wave forms of signals in FIG. 10(a).

In this embodiment, a signal $S_{23}$ from a monostable multivibrator 22 which is triggered by an acceleration signal $S_4$ so as to develop the signal $S_{23}$ and a driving pulse signal $S_6$ which is developed from the driving signal generator circuit 3 are sent to an OR gate circuit 23, which develops either one of the signals as the driving pulse signal $S_6$ upon receipt thereof, depending upon whether in the usual driving condition or in the accelerating driving condition.

By constituting in such a way, it becomes possible to develop the driving pulse signal $S_6'$ (of a pulse length of the signal $S_{23}$) without delay upon receipt of the acceleration signal $S_4$ so as to inject a fuel of a predetermined quantity in the accelerating driving condition.

As will be clear from the foregoing description, a fuel injection means for an internal combustion engine of an automobile in accordance with the present invention is constituted in such a way that the driving signal generator circuit 3 develops a driving signal $S_6$ of a pulse length corresponding to that of a signal $S_2$ as developed from the pulse length determination circuit 1 taking into account various kinds of driving conditions upon receipt of a fuel injection starting signal $S_5$ which is developed from the fuel injection starting signal generator circuit 2 upon receipt of a predetermined number of reference positional pulse signals $S_3$ in a usual driving condition and with a timing different from that in the usual driving condition upon receipt of an acceleration signal $S_{21}$. Accordingly, a fuel of a reliably controlled quantity is injected by means of the driving signal $S_6$ thus developed and supplied to a fuel injection valve with a reliably controlled timing not only in the usual driving condition but also in the accelerating driving condition.

Further, the fuel injection means for an internal combustion engine of an automobile in accordance with the present invention is constituted in such a way as to develop a driving signal $S_6$ of a pulse length corresponding to the same pulse length as that at the preceding time for fuel injection or to a constant pulse length which is always constant or to a pulse length obtained as a result of addition of the same pulse length as that at the preceding time for fuel injection and a constant pulse length which is always constant. Accordingly, it becomes possible to avoid the calculation of pulse length in the pulse length determination circuit 1 from being delayed when an acceleration signal $S_4$ is received.

The present invention has been described in terms of specific preferred embodiments and with reference to the accompanying drawings. This, however, is not to be taken in any way as limitative of the present invention which is to be defined by the appended claims. Many minor modifications to or alternations of the preferred embodiments will be clear to those skilled in the art, but are intended to remain within the scope of the present invention. For example, it is possible that a function similar to that in the circuit of FIG. 5 may be provided if the preset down counter 4 is program-controlled in accordance with a certain flow chart, and on the other hand, it is also possible that a function similar to that in the circuit of FIG. 6 may be provided if the circuit of FIG. 2(b) is program-controlled in accordance with a certain flow chart.

What is claimed is:

1. A fuel injection control system for an internal combustion engine having a fuel injection valve responsive to a fuel injection drive signal, an engine revolution sensor, and an acceleration detector for detecting an acceleration demand, said control system comprising:
   an arithmetic circuit responsive to an engine operating condition indicative signal for producing a fuel injection signal having a pulse width representative of the engine operating condition signal;
   a drive signal generator responsive to said fuel injection signal for producing said fuel injection drive signal, said drive signal having a pulse width proportional to the pulse width of said fuel injection signal;
   a timing signal generator for controlling and activating said drive signal generator, said timing signal generator being responsive to said engine revolution sensor to generate timing signals for activating said drive signal generator periodically and in synchronism with the revolution of the engine, said timing signal generator comprising means, responsive to a detected acceleration demand, for transiently generating an acceleration demanded timing signal for effecting a fuel injection in response to said acceleration demand, said means for transiently generating said acceleration demanded timing signal being operable to count a number of crank reference angle signals generated by said engine revolution sensor after a preceding injection drive signal, and
   when the number of said crank reference angle signal counted is less than a predetermined value, to generate, in response to an acceleration demand, said acceleration demanded timing signal in response to a crank reference angle signal generated immediately subsequent to said acceleration demand and to generate subsequent timing signals in response to a predetermined count of crank reference angle signals, and
   when the crank reference angle signal count is equal to or more than said predetermined value, to generate said timing signals in response to said predetermined count of crank reference angle signals.

2. A system as claimed in claim 1, wherein said fuel injection drive signal has a predetermined pulse width in response to said acceleration demand.

3. A system as claimed in claim 1, wherein said fuel injection drive signal is generated in synchronism with engine revolution in response to said detected acceleration demand in order to temporarily increase the frequency of fuel injection to increase the amount of the fuel injected in the engine upon said acceleration demand.

4. A system as claimed in claim 1, wherein said drive signal pulse width remains unchanged regardless of the presence of said detected acceleration demand.

5. A system as claimed in claim 1, wherein the acceleration demanded timing signal is produced in response to said detected acceleration demand and in synchronism with said timing signals.

6. A system as claimed in claim 5, wherein the acceleration demanded timing signal is produced immediately after the acceleration demand is detected.

7. A system as claimed in claim 1, wherein the drive signal generator is operable to generate a drive signal having a predetermined pulse width in response to said detected acceleration demand.

8. A system as claimed in claim 1, wherein said fuel injection drive signal has the same pulse width regardless of whether an acceleration demand is detected.

9. The system as set forth in claim 1, wherein said timing control generator is operable to output said acceleration demanded fuel injection timing signal in response to a detected acceleration demand immediately subsequent to said detected acceleration demand and with a pulse width corresponding to that of an immediately preceding fuel injection control signal.

10. The system as set forth in claim 1, wherein said timing control generator is operable to output said acceleration demanded fuel injection timing signal in response to a detected acceleration demand immediately subsequent to said detected acceleration demand wherein said timing signal has a predetermined fixed pulse width.

11. The system as set forth in claim 1, wherein said timing control generator is operable, subsequent to outputting said acceleration demanded timing signal, to return to a normal mode wherein said fuel injection timing signals are generated whenever said crank reference angle signal count equals said predetermined value.

12. The system as set forth in claim 11, wherein said acceleration demand is detected from one of an increasing engine load and change of engine speed.

13. The system as set forth in claim 12, wherein said acceleration demand is detected from a throttle valve angular position.

14. The system as set forth in claim 13, wherein said acceleration demand is produced when said throttle valve open angle increases at a rate beyond a predetermined rate.

15. The system as set forth in claim 11, wherein said acceleration demand is detected from an air flow rate in an air induction system based on said air flow rate increasing at a rate beyond a predetermined rate.

16. The system as set forth in claim 11, wherein said acceleration demand is detected from the fuel injection signal pulse width and is based on said pulse width increasing at a rate beyond a predetermined rate.

17. A fuel injection control system for an internal combustion engine having a fuel injection valve responsive to a fuel injection drive signal, an engine revolution sensor, and an acceleration detector for detecting an acceleration demand, said control system comprising:

an arithmetic circuit responsive to an engine operating condition indicative signal for producing a fuel injection signal having a pulse width representative of the engine operating condition;

a drive signal generator responsive to said fuel injection signal for producing said fuel injection drive signal, said drive signal having a pulse width proportional to the pulse width of said fuel injection signal;

a timing signal generator for controlling and activating said drive signal generator, said timing signal generator being responsive to said engine revolution sensor to generate timing signals for activating said drive signal generator periodically and in synchronism with the revolution of the engine, said timing signal generator including means, responsive to a detected acceleration demand, for transiently generating an acceleration demanded timing signal for effecting fuel injection in response to said acceleration demand, said means for transiently generating said acceleration demanded timing signal being operable to count a number of crank reference angle signals generated after a preceding injection drive signal; and when the number of said crank reference angle signal counted is less than a predetermined value, to generate, in response to an acceleration demand, said acceleration demanded timing signal in response to a crank reference angle signal occurring immediately subsequent to said acceleration demand and to generate subsequent timing signals in response to a predetermined count of crank reference angle signals, and when the crank reference angle signal count is equal to or more than said predetermined value, to generate said timing signals in response to said acceleration demand indicative signal and in response to a crank reference angle signals occurring immediately subsequent to said acceleration demand, and thereafter, in response to said predetermined count of crank reference angle signals.

18. A system as claimed in claim 17, wherein said fuel injection drive signal is generated in synchronism with engine revolution in response to said detected acceleration demand in order to temporarily increase the frequency of fuel injection to increase the amount of the fuel injected in the engine upon said acceleration demand.

19. A system as claimed in claim 17, wherein the drive signal generator is operable to generate a fuel injection drive signal having a predetermined pulse width in response to said detected acceleration demand.

20. A system as claimed in claim 17, wherein said drive signal pulse width remains unchanged regardless of the presence of said detected acceleration demand.

21. A system as claimed in claim 17, wherein a pulse of said fuel injection drive signal has a predetermined pulse width in response to said acceleration demand.

22. A system as claimed in claim 17, wherein a pulse of said fuel injection drive signal has the same pulse width regardless of whether the acceleration demand is present.

* * * * *